United States Patent
Smith et al.

(10) Patent No.: US 11,391,219 B2
(45) Date of Patent: Jul. 19, 2022

(54) HEALTH MONITOR FOR AIR SWITCHING SYSTEM

(71) Applicant: PRATT & WHITNEY CANADA CORP., Longueuil (CA)

(72) Inventors: Michael Paul Smith, Mississauga (CA); Hytham Mokhtar, Pointe-Claire (CA); Daniel Arnone, Burlington (CA); Patrick Manoukian, Saint-Laurent (CA)

(73) Assignee: PRATT & WHITNEY CANADA CORP., Longueuil (CA)

( * ) Notice: Subject to any disclaimer, the term of this patent is extended or adjusted under 35 U.S.C. 154(b) by 354 days.

(21) Appl. No.: 16/591,857

(22) Filed: Oct. 3, 2019

(65) Prior Publication Data

US 2020/0332725 A1 Oct. 22, 2020

Related U.S. Application Data

(60) Provisional application No. 62/835,806, filed on Apr. 18, 2019.

(51) Int. Cl.
F02C 9/18 (2006.01)
F04D 27/02 (2006.01)

(52) U.S. Cl.
CPC ............ *F02C 9/18* (2013.01); *F04D 27/0215* (2013.01); *F04D 27/0223* (2013.01); *F05D 2260/80* (2013.01); *F05D 2270/301* (2013.01)

(58) Field of Classification Search
CPC .... F02C 9/18; F04D 27/0215; F04D 27/0223; F05D 2270/301
See application file for complete search history.

(56) References Cited

U.S. PATENT DOCUMENTS 2,786,331 A 3/1957 Williams
3,325,994 A 6/1967 Zaba et al.
(Continued)

FOREIGN PATENT DOCUMENTS

CA 2965946 3/2018
CN 207935063 U 10/2018
(Continued)

OTHER PUBLICATIONS

John H. Perepezko, The Hotter the Engine, the Better, Nov. 20, 2009, AAAS, Science, www.sciencemag.org vol. 326, pp. 1068-1069.
(Continued)

*Primary Examiner* — Todd E Manahan
*Assistant Examiner* — Rodolphe Andre Chabreyrie
(74) *Attorney, Agent, or Firm* — Norton Rose Fulbright Canada LLP (57) ABSTRACT

A method of operating a gas turbine engine having a bleed air system with a switching valve, operable to switch between multiple air sources depending on an operating mode of the gas turbine engine (e.g. a motive powered mode or a standby mode), is described. The method includes operating the switching valve to provide pressurized air from a selected one or more of the multiple air sources to a cavity of the gas turbine engine having seals, and testing the switching valve to determine if the switching valve is functioning normally or abnormally. The switching valve is functioning normally when operable to switch between the multiple air sources and is functioning abnormally when switching between the multiple air sources is not possible. If the switching valve is determined to be functioning abnormally, the gas turbine engine is controlled to prevent a change of the operating mode.

17 Claims, 6 Drawing Sheets

(56) References Cited

U.S. PATENT DOCUMENTS

| | | | |
|---|---|---|---|
| 3,851,464 | A | 12/1974 | Davis et al. |
| 3,869,862 | A | 3/1975 | Dickey |
| 4,083,181 | A | 4/1978 | Adamson |
| 4,213,738 | A | 7/1980 | Williams |
| 4,217,755 | A | 8/1980 | Williams |
| 4,251,985 | A | 2/1981 | Sullivan |
| 4,625,510 | A | 12/1986 | Evans |
| 4,627,234 | A | 12/1986 | Schuh |
| 4,741,164 | A | 5/1988 | Slaughter |
| 4,900,231 | A | 2/1990 | Kennedy |
| 5,018,601 | A | 5/1991 | Waddington et al. |
| 5,161,364 | A | 11/1992 | Bruun et al. |
| 5,429,208 | A | 7/1995 | Largillier et al. |
| 5,553,449 | A | 9/1996 | Rodgers et al. |
| 5,553,461 | A | 9/1996 | Hitzigrath et al. |
| 6,282,882 | B1 | 9/2001 | Dudd, Jr. et al. |
| 6,344,949 | B1 | 2/2002 | Albrecht et al. |
| 6,751,979 | B2 | 6/2004 | Leathers |
| 6,792,746 | B2 | 9/2004 | Saito et al. |
| 6,845,606 | B2 | 1/2005 | Franchet et al. |
| 6,868,664 | B2 | 3/2005 | Albero et al. |
| 6,885,917 | B2 | 4/2005 | Osder et al. |
| 6,921,244 | B2 | 7/2005 | Johnson |
| 7,104,282 | B2 | 9/2006 | Hooker et al. |
| 7,121,078 | B2 | 10/2006 | Turco et al. |
| 7,328,098 | B1 | 2/2008 | VanderLeest et al. |
| 7,464,533 | B2 | 12/2008 | Wollenweber |
| 7,584,618 | B2 | 9/2009 | Amiot et al. |
| 7,584,619 | B2 | 9/2009 | Granitz et al. |
| 7,797,962 | B2 | 9/2010 | Kresser et al. |
| 7,843,354 | B2 | 11/2010 | Holt et al. |
| 7,861,536 | B2 | 1/2011 | Alecu et al. |
| 7,959,109 | B2 | 6/2011 | Dasilva et al. |
| 7,980,052 | B1 | 7/2011 | Paulino |
| 8,245,493 | B2 | 8/2012 | Minto |
| 8,453,462 | B2 | 6/2013 | Wichmann et al. |
| 8,511,058 | B2 | 8/2013 | Agrawal et al. |
| 8,529,189 | B2 | 9/2013 | Brown et al. |
| 8,778,091 | B1 | 7/2014 | Lockyer |
| 8,967,528 | B2 | 3/2015 | Mackin et al. |
| 9,068,463 | B2 | 6/2015 | Pandey et al. |
| 9,068,465 | B2 | 6/2015 | Pandey et al. |
| 9,205,927 | B2 | 12/2015 | Shepard et al. |
| 9,222,578 | B2 | 12/2015 | Long |
| 9,279,341 | B2 | 3/2016 | Durocher et al. |
| 9,297,304 | B2 | 3/2016 | Nordstrom |
| 9,359,949 | B2 | 6/2016 | Olivarez et al. |
| 9,611,947 | B2 | 4/2017 | Hallisey et al. |
| 9,624,831 | B2 | 4/2017 | Brousseau et al. |
| 9,631,512 | B2 | 4/2017 | Lockyer |
| 9,810,158 | B2 | 11/2017 | Foutch et al. |
| 9,902,500 | B2 | 2/2018 | Stadler et al. |
| 9,903,221 | B2 | 2/2018 | Jacobs et al. |
| 9,995,222 | B2 | 6/2018 | Schwarz et al. |
| 10,054,051 | B2 | 8/2018 | Foutch et al. |
| 10,060,358 | B2 | 8/2018 | Tiwari et al. |
| 10,100,730 | B2 | 10/2018 | Huppe et al. |
| 10,100,744 | B2 | 10/2018 | Mackin et al. |
| 10,107,206 | B2 | 10/2018 | Forcier et al. |
| 10,125,691 | B2 | 11/2018 | Feulner et al. |
| 10,138,812 | B2 | 11/2018 | Heaton et al. |
| 10,155,592 | B2 | 12/2018 | McAuliffe et al. |
| 10,293,945 | B2 | 5/2019 | Hoffjann et al. |
| 10,415,468 | B2 | 9/2019 | Ackermann et al. |
| 10,451,491 | B2 | 10/2019 | Chapman |
| 10,458,267 | B2 | 10/2019 | Gibson et al. |
| 10,458,278 | B2 | 10/2019 | Avis et al. |
| 10,461,348 | B2 | 10/2019 | Im et al. |
| 10,487,751 | B2 | 11/2019 | DiBenedetto |
| 10,508,601 | B2 | 12/2019 | Sheridan et al. |
| 10,563,590 | B2 | 2/2020 | Coldwate et al. |
| 10,569,887 | B2 | 2/2020 | Valiquette et al. |
| 2002/0189230 | A1 | 12/2002 | Franchet et al. |
| 2003/0131585 | A1 | 7/2003 | Saito et al. |
| 2004/0168427 | A1 | 9/2004 | Truco et al. |
| 2006/0123796 | A1 | 6/2006 | Aycock et al. |
| 2007/0289285 | A1 | 12/2007 | Jorn |
| 2010/0058731 | A1 | 3/2010 | Haehner et al. |
| 2010/0326085 | A1 | 12/2010 | Veilleux |
| 2011/0202251 | A1* | 8/2011 | Luppold .............. F02C 9/42 |
| | | | 701/100 |
| 2011/0271687 | A1 | 11/2011 | Nordstrom et al. |
| 2012/0023962 | A1 | 2/2012 | Wichmann et al. |
| 2012/0139370 | A1 | 6/2012 | Pal |
| 2012/0240588 | A1 | 9/2012 | Patel et al. |
| 2012/0304663 | A1 | 12/2012 | Weber et al. |
| 2013/0040545 | A1 | 2/2013 | Finney |
| 2013/0174574 | A1 | 7/2013 | Heaton et al. |
| 2014/0238042 | A1* | 8/2014 | Munsell .............. F02C 9/18 |
| | | | 29/889.22 |
| 2014/0366547 | A1 | 12/2014 | Kraft et al. |
| 2016/0003144 | A1 | 1/2016 | Kupratis |
| 2016/0123237 | A1 | 5/2016 | Spagnoletti |
| 2016/0273393 | A1 | 9/2016 | Ekanayake et al. |
| 2016/0332737 | A1 | 11/2016 | Sabnis et al. |
| 2016/0369695 | A1 | 12/2016 | Perlak et al. |
| 2017/0016399 | A1* | 1/2017 | Bedrine .............. F02C 6/08 |
| 2017/0106985 | A1 | 4/2017 | Stieger et al. |
| 2017/0191419 | A1 | 7/2017 | Bayraktar et al. |
| 2017/0210478 | A1 | 7/2017 | Mackin |
| 2017/0268431 | A1 | 9/2017 | Schwarz |
| 2017/0298836 | A1 | 10/2017 | Tiwari et al. |
| 2017/0335772 | A1 | 11/2017 | Coldwate et al. |
| 2017/0369180 | A1 | 12/2017 | Jones et al. |
| 2018/0010520 | A1 | 1/2018 | Iwasaki et al. |
| 2018/0022463 | A1 | 1/2018 | Teicholz et al. |
| 2018/0045115 | A1 | 2/2018 | Glann et al. |
| 2018/0057170 | A1 | 3/2018 | Sautron |
| 2018/0058336 | A1 | 3/2018 | Munevar |
| 2018/0073428 | A1 | 3/2018 | Morgan et al. |
| 2018/0080378 | A1 | 3/2018 | Alecu |
| 2018/0080380 | A1 | 3/2018 | Simonetti |
| 2018/0093778 | A1 | 4/2018 | Spack et al. |
| 2018/0128176 | A1 | 5/2018 | Staubach et al. |
| 2018/0135525 | A1 | 5/2018 | Morgan et al. |
| 2018/0334918 | A1* | 11/2018 | Ortiz .............. F01D 21/003 |
| 2019/0010876 | A1 | 1/2019 | Deroy et al. |
| 2019/0032574 | A1 | 1/2019 | Maguire et al. |
| 2019/0063324 | A1 | 2/2019 | Gould et al. |
| 2019/0232497 | A1 | 8/2019 | Tall et al. |
| 2019/0283887 | A1 | 9/2019 | Ernst et al. |
| 2019/0309683 | A1 | 10/2019 | Mackin et al. |
| 2019/0368417 | A1 | 12/2019 | Terwilliger |
| 2019/0383167 | A1 | 12/2019 | Schwarz et al. |
| 2019/0383220 | A1 | 12/2019 | Mackin |
| 2020/0032702 | A1 | 1/2020 | Kupratis |
| 2020/0095931 | A1 | 3/2020 | Vinski |
| 2020/0248627 | A1 | 8/2020 | Amari |

FOREIGN PATENT DOCUMENTS

| | | |
|---|---|---|
| EP | 1923575 | 5/2008 |
| EP | 2267288 | 12/2010 |
| EP | 2407652 A1 | 1/2012 |
| EP | 3095703 | 11/2016 |
| EP | 3282094 | 2/2018 |
| EP | 3318727 | 5/2018 |
| EP | 3323727 | 5/2018 |
| WO | 2012007341 A1 | 1/2012 |
| WO | 2013154630 | 10/2013 |
| WO | 2014033220 A1 | 3/2014 |

OTHER PUBLICATIONS

S. Kuz'michev, V. N. Rybalko, A. Y. Tkachenko and I. N. Krupenich, Optimization of Working Process Parameters of Gas Turbine Engines Line on the Basis of Unified Engine Core, ARPN Journal of Engineering and Applied Sciences, vol. 9, No. 10, Oct. 2014, ISSN 1819-6608, p. 1877.

The PW100 Engine: 20 Years of Gas Turbine Technology Evolution, E. Hosking, D. P. Kenny, R. I. McCormick S. H. Moustapha, P. Sampath, A. A. Smailys, presented at the RTO A VT Symposium (56) References Cited

OTHER PUBLICATIONS on "Design Principles and Methods for Aircraft Gas Turbine Engines", held in Toulouse, France, May 11-15, 1998, and published in RTO MP-8—relevant section : p. 4-7, col. 2, lines 5-12.
European Search Report dated Feb. 11, 2021 for Application No. 20166019.8.
European Search Report dated Jun. 10, 2021 for Application No. 20201413.0.
European Search Report issued in Application No. 20165886.1 dated Aug. 17, 2020.

* cited by examiner

FIG_4

HEALTH MONITOR FOR AIR SWITCHING SYSTEM

CROSS-REFERENCE

The present application claims the benefit of U.S. Patent Application No. 62/835,806, filed Apr. 18, 2019, entitled "HEALTH MONITOR FOR AIR SWITCHING SYSTEM", the entirety of which is hereby incorporated herein by reference in its entirety.

TECHNICAL FIELD

The disclosure relates to operation of a multi-engine aircraft and, more particularly, to operation of engine air systems for such a multi-engine aircraft.

BACKGROUND

Bleed air produced by a gas turbine engine is compressed air from the compressor stage that is used for engine functions (such as cooling of turbines and to help seal bearing cavities, for example) and is also used for aircraft functions (such as engine starting, cabin pressure, pneumatic systems, pressurizing liquid tanks, etc.). Engine bleed air can be derived from the high pressure or the low pressure compressor stage, depending on the air pressure requirements and the engine operating condition. Low pressure stage air is typically used during high power engine operation, and high pressure stage air may be used during descent and other low power engine operations. Bleed air may be used within an engine for engine functions such as bearing cavity sealing and cooling of various engine components. Improvement is desirable to optimize operation of the efficiency of compressed air systems.

Failure to provide sufficient pressurized air for the engine demands during lower power operation states of an engine can however result in oil seal degradation, oil leakage contamination of cabin air and overheating of air cooled components. Improvement is desirable to monitor and control the delivery of sufficient compressed air for the air demands of engine components when the engine is running in low power operating regimes.

SUMMARY

There is according provided, a method of operating a gas turbine engine having a bleed air system with a switching valve operable to switch between multiple air sources depending on an operating mode of the gas turbine engine, the operating mode including a motive powered mode and a standby mode, the method comprising: operating the switching valve to provide pressurized air from a selected one or more of the multiple air sources to a cavity of the gas turbine engine having seals, and pressurizing the seals of the cavity using the pressurized air; testing the switching valve to determine if the switching valve is functioning normally or abnormally, the switching valve functioning normally when operable to switch between the multiple air sources and functioning abnormally when switching between the multiple air sources is not possible; and if the switching valve is determined to be functioning abnormally, controlling the gas turbine engine to prevent a change of the operating mode thereof.

There is also provided, a gas turbine engine, comprising: a bleed air system including a switching valve having at least first and second air inlets and an outlet in communication with a cavity of the gas turbine engine having one or more seals therein, the first inlet of the air switching valve in communication with a low pressure air source, the second inlet of the air switching valve in communication with a high pressure air source; and a switching valve health monitor, the switching valve health monitor operable to determine if the switching valve is functioning normally or abnormally, the switching valve functioning normally when operable to switch between the first and second inlets, and the switching valve functioning abnormally when switching between the first and second inlets is not possible or the switching valve is otherwise not operating as expected.

There is further provided, a multi-engine aircraft comprising: a first gas turbine engine for providing a first engine power output; and a second engine for providing a second engine power output, the second engine having a bleed air system and an air switching system including: an switching valve having: a low pressure inlet in communication with a first bleed location in a compressor of the second engine; a high pressure inlet in communication with a second bleed location in the compressor of the second engine, the second bleed location being downstream of the first bleed location relative to main gas flow through the compressor of the second engine; and a switch outlet in communication with at least one cavity of the second engine having seals therein; wherein the switching valve is displaceable between at least first and second positions, the first position interconnecting the lower pressure inlet and the switch outlet, and the second position interconnecting the high pressure inlet and the switch outlet; and a switching valve health monitor, the switching valve health monitor including at least one of a pressure sensor and a position sensor operable to determine if the switching valve is functioning normally or abnormally, the switching valve functioning normally when operable to switch between the first and second positions and functioning abnormally when switching between the first and second positions is not possible.

There is also provided a method of operating a gas turbine engine having a bleed air system and a switching valve operable to switch between low and high pressure air source inlets and having an outlet in communication with the bleed air system, the method comprising: actuating the switching valve between a motive powered mode and a standby mode, wherein low pressure compressed air is conveyed to the bleed air system when the switching valve is in the motive powered mode, and wherein high pressure compressed air is conveyed to the bleed air system when the switching valve is in the standby mode; sensing a standby mode pressure using a bleed sensor located downstream from the switching valve; comparing the standby mode pressure to a reference pressure; and when the standby mode pressure is equal to or greater than the reference pressure, maintaining the switching valve in the standby mode; and when the standby mode pressure is less than the reference pressure, actuating the switching valve from the standby mode to the motive powered mode.

In the gas turbine engine as defined above, the control means are adapted, in at least one embodiment, for: before actuating the switching valve from the motive powered mode to the standby mode, sensing the reference pressure comprising an initiation pressure using the bleed sensor located downstream from the valve outlet of the switching valve; and after actuating the switching valve from the motive powered mode to the standby mode, comparing the standby mode pressure to the initiation pressure to determine an initial pressure differential; and when the initial pressure differential is equal to or greater than a downstream reference value, maintaining the switching valve in the standby mode; and when the initial pressure differential is less than the downstream reference value, actuating the switching valve from the standby mode to the motive powered mode In the gas turbine engine as defined above, the control means are adapted, in at least one embodiment, for: comparing the initial pressure differential to the downstream reference value; and determining a switching valve status being one of: the switching valve is fully open; the switching valve is fully closed; and the switching valve is partially open.

The gas turbine engine as defined above includes, in at least one embodiment: a source sensor located upstream from the high pressure inlet of the switching valve; and wherein the control means are adapted for: before actuating the switching valve from the motive powered mode to the standby mode, sensing the reference pressure comprising a source pressure using the source sensor; and after actuating the switching valve from the motive powered mode to the standby mode, comparing the standby mode pressure to the source pressure to determine a secondary pressure differential; and when the secondary pressure differential is less than an upstream reference value, maintaining the switching valve in the standby mode; and when the secondary pressure differential is equal to or greater than the upstream reference value, actuating the switching valve from the standby mode to the motive powered mode.

In the gas turbine engine as defined above, the control means are adapted, in at least one embodiment, for: comparing the secondary pressure differential to the upstream reference value; and determining a switching valve status being one of: the switching valve is fully open; the switching valve is fully closed; and the switching valve is partially open.

Pressure sensors upstream or downstream from the switching valve can be used to monitor the operation and determine the status of the switching valve. A change in static pressure or the measurement of a pressure differential across the switching valve will provide an indication of whether the switching valve is fully open, fully closed or partially open.

In accordance with embodiments of the present description, malfunction of the switching valve can be detected and can result in aborting of the standby mode operation. Aborting standby mode operation results in a return to the full power motive powered mode to provide sufficient compressed air to avoid engine damage, hazardous or undesirable conditions, such as oil seal degradation, oil contamination of the aircraft cabin air and overheating of air cooled components of the engine.

Further details of these and other aspects of the subject matter of this application will be apparent from the detailed description included below and the drawings.

DETAILED DESCRIPTION

Figure 1:
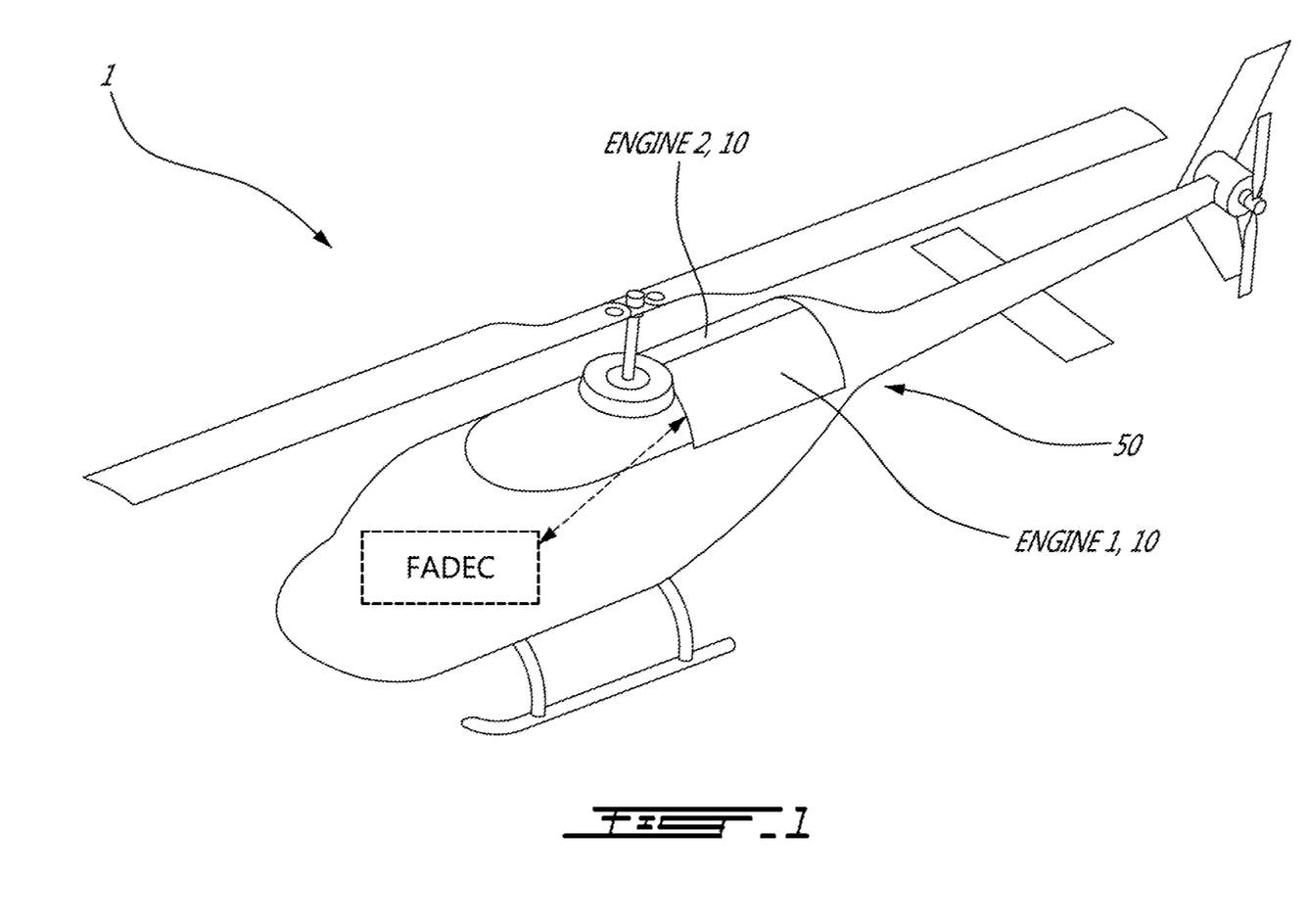
FIG. 1 is a schematic view of a multi-engine aircraft.

FIG. 1 depicts an exemplary multi-engine aircraft 1, which in this case is a helicopter. The aircraft 1 may however also be a fixed-wing aircraft. The aircraft 1 includes at least two gas turbine engines 10, labeled in FIG. 1 as "ENGINE 1" and "ENGINE 2". These two engines may be interconnected, in the case of the depicted helicopter application, by a common gearbox to form a multi-engine system 50 as shown in FIG. 2.

Figure 2:
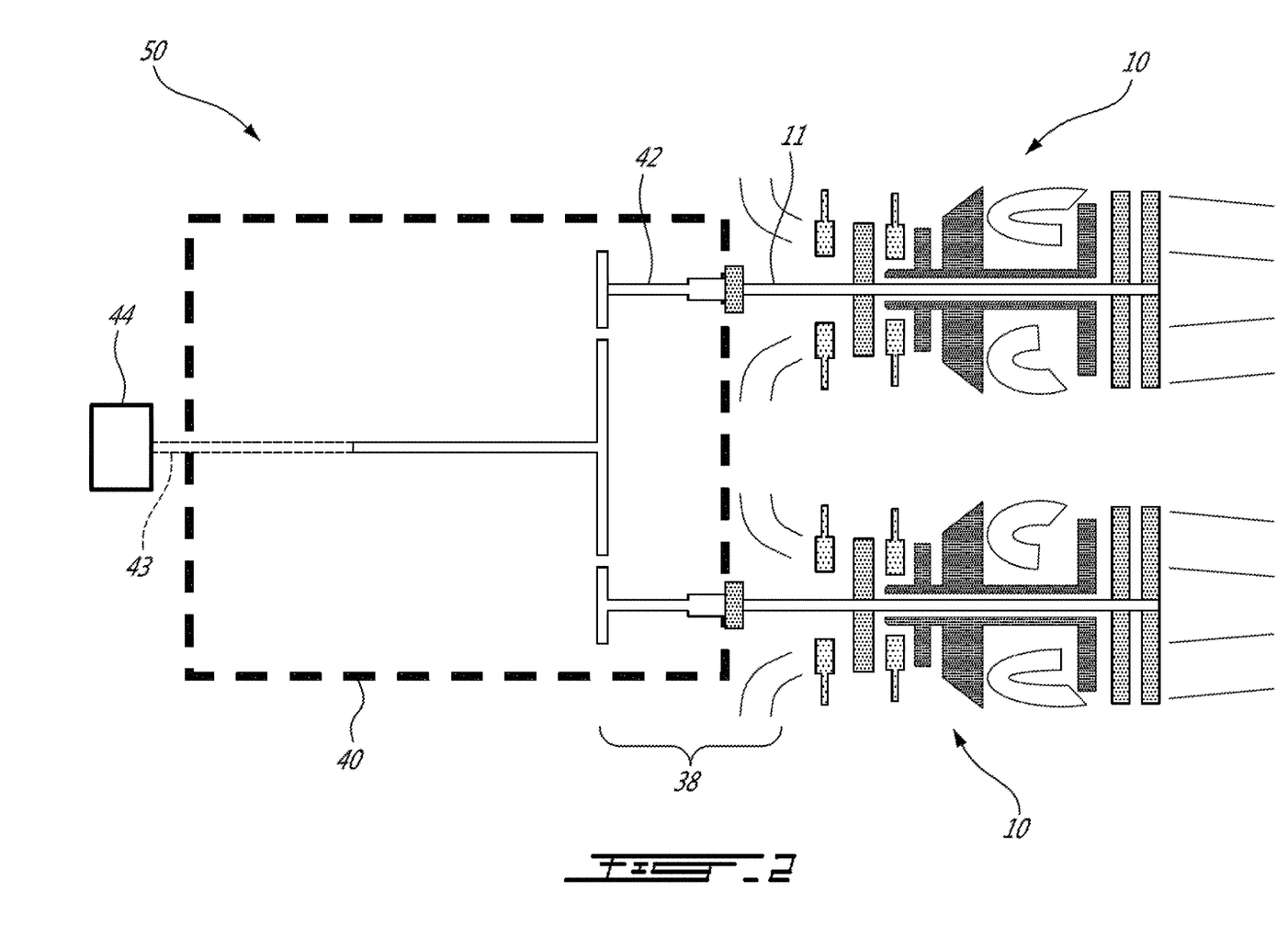
FIG. 2 is a schematic representation of an exemplary multi-engine system for the aircraft of FIG. 1, showing axial cross-sectional views of two gas turbine engines.

FIG. 2 illustrates a schematic representation of an exemplary multi-engine system 50 that may be used as a power plant for the aircraft 1. The multi-engine system 50 comprises two or more gas turbine engines 10. The multi-engine system 50 may manage the operation of the engines 10, as will be described in further detail below. The multi-engine system 50 may be used as a twin-pack type engine for an aircraft, such as a helicopter. In addition to airborne applications, the multi-engine system 50 may be used in marine and/or industrial applications.

More particularly, the multi-engine system 50 of this embodiment includes first and second turboshaft engines 10 each having a respective transmission 38 which are interconnected by a common output gearbox 40 to drive a common load 44. In one embodiment, the common load 44 may comprise a rotary wing of a rotary-wing aircraft. For example, the common load 44 may be a main rotor of the helicopter 1. Depending on the type of the common load 44 and on the operating speed thereof, each of turboshaft engines 10 may be drivingly coupled to the common load 44 via the output gearbox 40, which may be of the speed-reduction type.

For example, the gear box 40 may have a plurality of transmission shafts 42 to receive mechanical energy from respective output shafts 11 of respective turboshaft engines 10. The gear box 40 may be configured to direct at least some of the combined mechanical energy from the plurality of the turboshaft engines 10 toward a common output shaft 43 for driving the common load 44 at a suitable operating (e.g., rotational) speed. It is understood that the multi-engine system 50 may also be configured, for example, to drive accessories and/or other elements of an associated aircraft. As will be described, the gear box 40 may be configured to permit the common load 44 to be driven by either of the turboshaft engines 10 or, by a combination of both engines 10 together.

Figure 3:
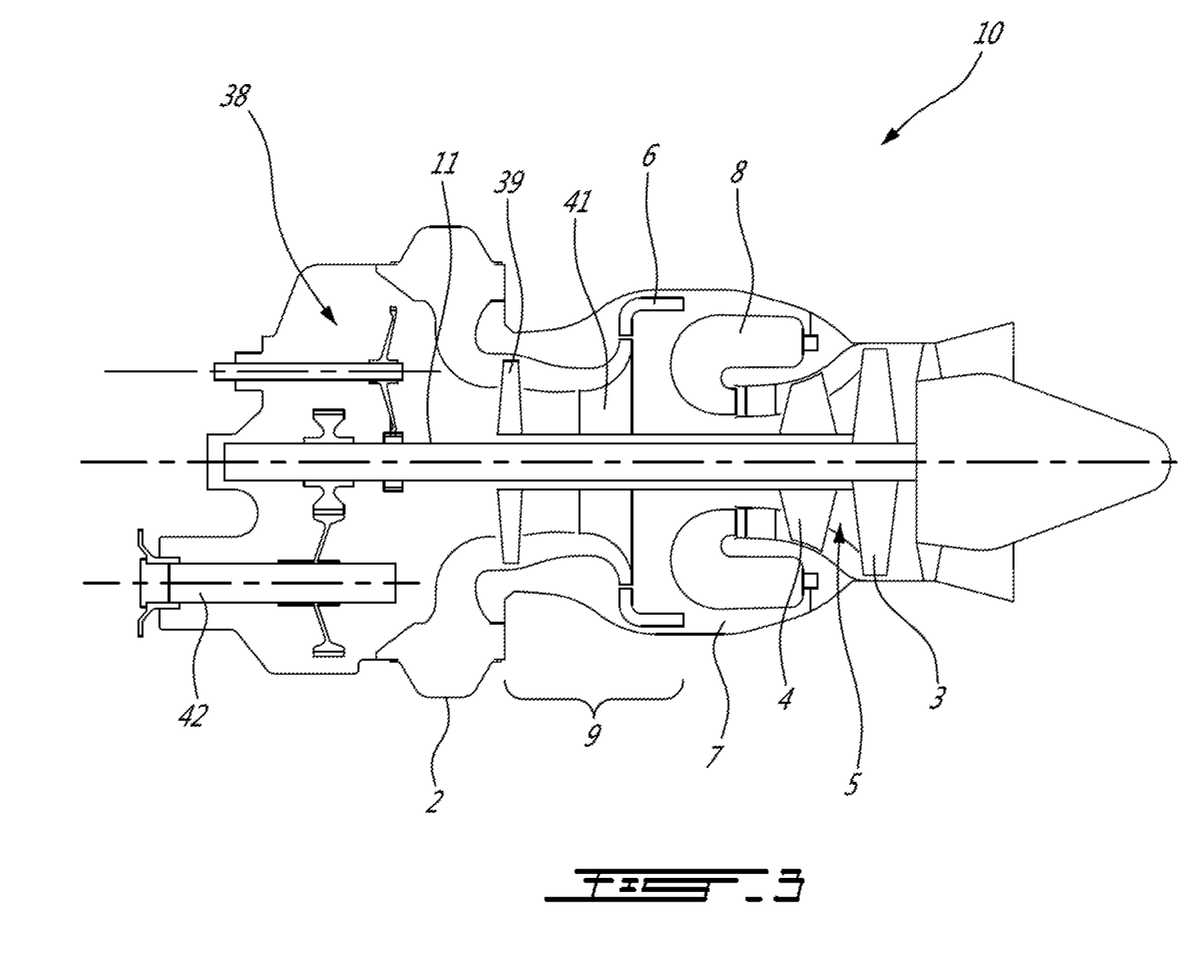
FIG. 3 is an axial cross-sectional view of one of the gas turbine engines of FIG. 2, for the multi-engine aircraft of FIG. 1.

Referring now to FIG. 3, the gas turbine engine 10 is of a type provided, in one embodiment, for use in subsonic flight, generally comprising in serial flow communication a compressor section 9 for pressurizing the air, a combustor 8 in which the compressed air is mixed with fuel and ignited for generating an annular stream of hot combustion gases, and a turbine section 5 for extracting energy from the combustion gases.

The engine 10 depicted in FIG. 3 is a turboshaft gas turbine engine, and therefore includes a reduction gearbox and transmission 38 with a transmission shaft 42 which is configured to provide power output from the engine 10 to the common aircraft gearbox 40 of the multi-engine system 50 of FIG. 2. However, it is to be understood that the present disclosure may also be applicable to other types of gas turbine engines, including turboprops and turbofans for example.

Referring still to FIG. 3, the gas turbine engine 10 includes an air inlet 2 via which air enters the engine 10 before being directed into the compressor section 9 of the engine. In the depicted embodiment, the compressor section 9 includes a low-pressure axial compressor 39 and a high-pressure centrifugal compressor 41. Compressed air exits the high pressure compressor 41 through a diffuser 6 and is contained within a plenum 7 that surrounds the combustor 8. Fuel is supplied to the combustor 8 through fuel nozzles fed by a fuel system, wherein the injected fuel from the fuel nozzles is mixed with the compressed air within the combustor 8 thereby causing the fuel-air mixture to be ignited within the combustion chamber. A portion of the compressed air within the plenum 7 is therefore admitted into the combustor 8 through orifices in the side walls to create a cooling air curtain along the combustor walls. A portion of the compressed air is also is used as bleed air for pneumatic systems within and/or external to the engine. The annular stream of hot combustion gases exiting the combustor 8 is directed to a downstream turbine section 5 for extracting energy from the combustion gases before exiting the engine as exhaust. The turbine section 5 may include one or more turbine rotors. In the embodiment of FIG. 2, a high pressure turbine drives a high pressure engine shaft to which both the low and high pressure compressors 39 and 41 are connected for driving same, and a low pressure turbine 3 drives a low pressure turbine shaft which is coaxial with the low pressure engine shaft and drives the power output shaft 11, and the gearbox 38, of the engine 10.

As will be seen, the air bled from the engine 10 is, in at least a particular embodiment, to be re-used for engine secondary air demands for air only, but not the air demands of the aircraft fuselage or cabin. The present disclosure describes a method of monitoring the engine 10 when operating in a lower power, or "standby" mode and switching to an alternate bleed air source, while ensuring that the engine demands for pressurized air are satisfied, including pressurized oil seals, and turbine cooling systems. The methods and functions of the aircraft 1 described herein may be executed for example by any suitable controller(s), such as a full-authority digital controller (FADEC) (FIGS. 1 and 5) in one non-limiting embodiment, which may be operatively connected with the engines 1, 2 and sensors described herein using any suitable connections, such as wired and/or wireless for example, and may be configured using for example conventional programming/configuration methods to carry out the functionality described herein.

The present description relates generally to operating a multi-engine aircraft 1, where a first engine of the gas turbine engines 10 is capable of providing motive power in flight to the aircraft 1 when operating in a "powered mode", and a second engine of the gas turbine engines 10 can be switched between the powered mode, whereby the second engine also provides motive power to the aircraft, and a lower-power "standby mode", whereby substantially no (or very little) motive power is provide to the aircraft. The second engine may therefore be switched into, and maintained in, this very low-power standby mode during flight. The standby mode of the second engine includes, but is not limited to a significantly reduced power mode, i.e. a so-called "sub-idle" regime or "idle cruise" regime. The term "standby mode" as used herein is therefore understood to be such a low power regime. By operating the second engine in this standby mode (sub-idle or idle cruise regime) during flight, fuel consumption of the second engine, and therefore over the overall powerplant, is reduced. The second engine however remains able to return to normal operational power (e.g. full power) if additional power needed by the aircraft.

Although various differential control sequences between the engines 10 are possible, in one particular embodiment the controller(s) (e.g. (FADEC)) may correspondingly control fuel flow rate to each engine 10 as follows. In the case of the standby engine, a fuel flow (and/or a fuel flow rate) provided to the standby engine may be controlled to be between 70% and 99.5% less than the fuel flow (and/or the fuel flow rate) provided to the active engine (i.e. the engine 10 operating in the powered mode). The standby engine may be maintained between 70% and 99.5% less than the fuel flow to the active engine. In some embodiments, the fuel flow rate difference between the active and standby engines may be controlled to be in a range of 70% and 90% of each other, with fuel flow to the standby engine being 70% to 90% less than the active engine. In some embodiments, the fuel flow rate difference may be controlled to be in a range of 80% and 90%, with fuel flow to the standby engine being 80% to 90% less than the active engine.

In another embodiment, the controller(s) may operate one engine in a standby mode at a power substantially lower than a rated cruise power level of that engine, and in some embodiments at zero output power and in other embodiments less than 10% output power relative to a reference power (provided at a reference fuel flow). Alternately still, in some embodiments, the controller(s) may control the standby engine to operate at a power in a range of 0% to 1% of a rated full-power of the standby engine (i.e. the power output of the second engine to the common gearbox remains between 0% to 1% of a rated full-power of the second engine when the second engine is operating in the standby mode).

The first engine as described herein may be referred to as a "main" or "primary" engine, and the second engine may be referred to herein as a "reserve" engine. However, it is to be understood that both are capable of operating at full power to propel the aircraft 1 if desired/necessary.

Figure 4:
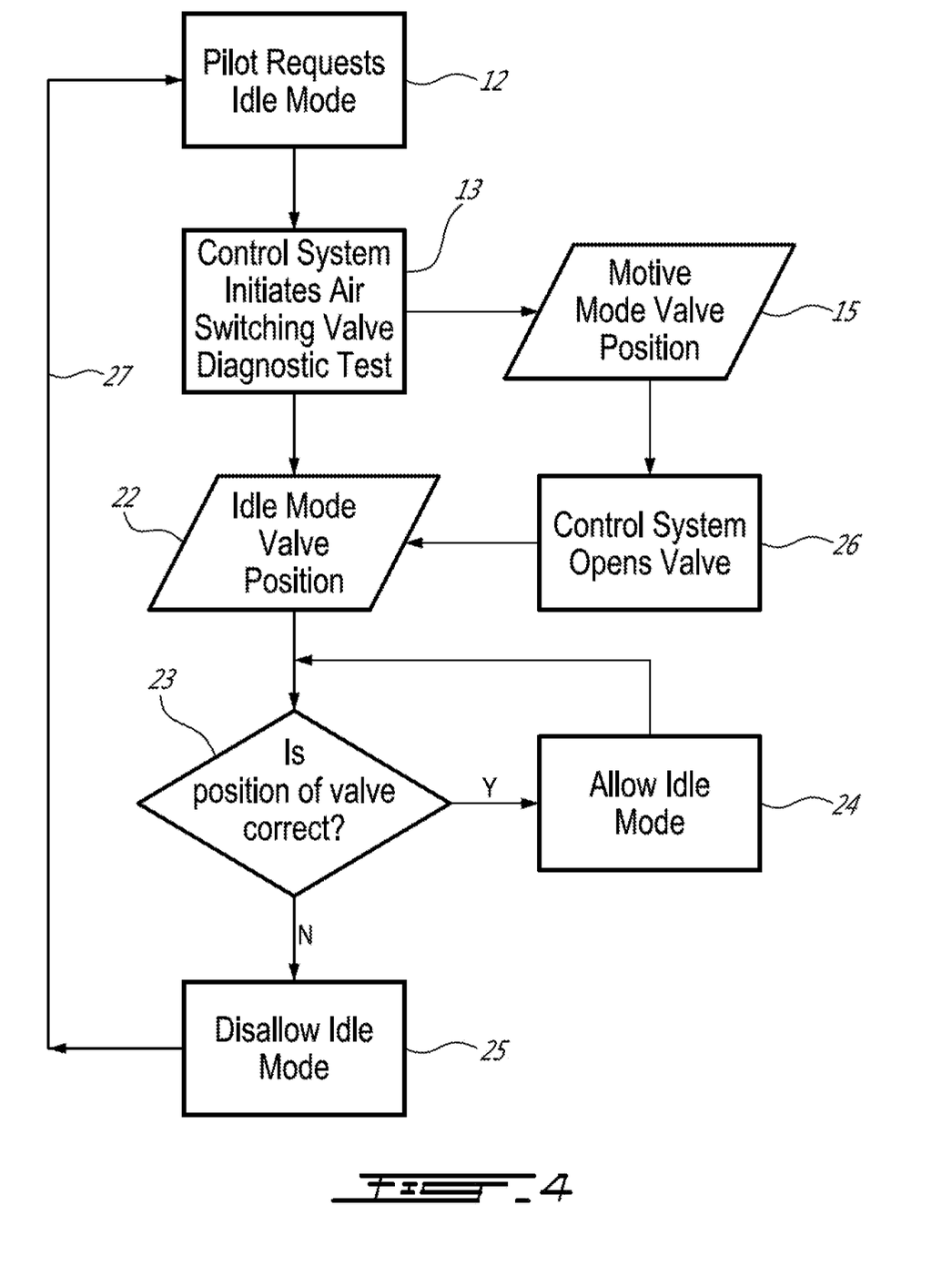
FIG. 4 is a schematic flow chart showing the operation of the control system logic to determine the operating position of the air source input switching valve, and inhibit or allow the idle cruise regime (ICR) accordingly.
Figure 5:
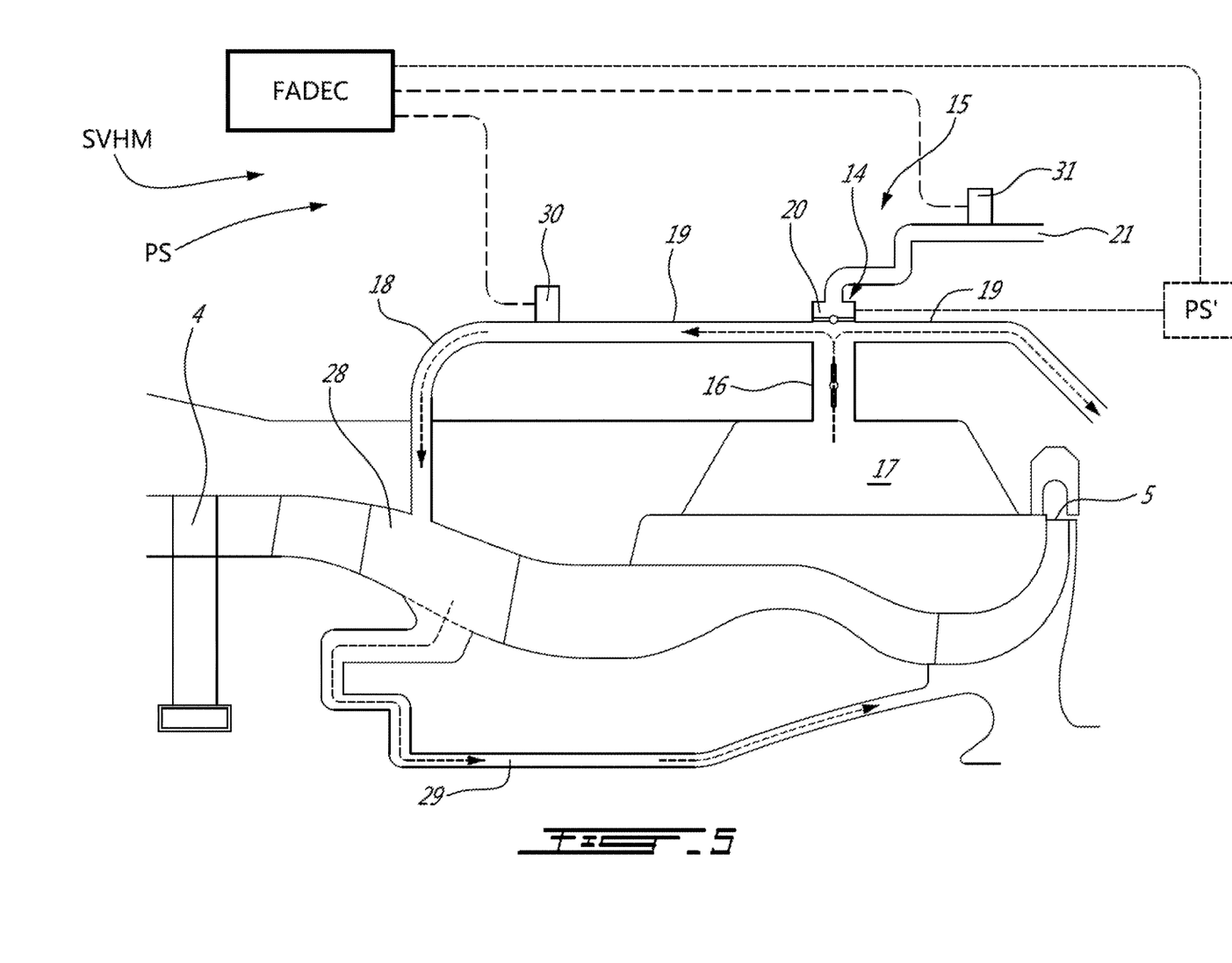
FIG. 5 is a detail axial cross section through a compressor section of the engine showing the air source input switching valve in a motive powered mode using low pressure compressor air for supplying the bleed air system of the engine.
Figure 6:
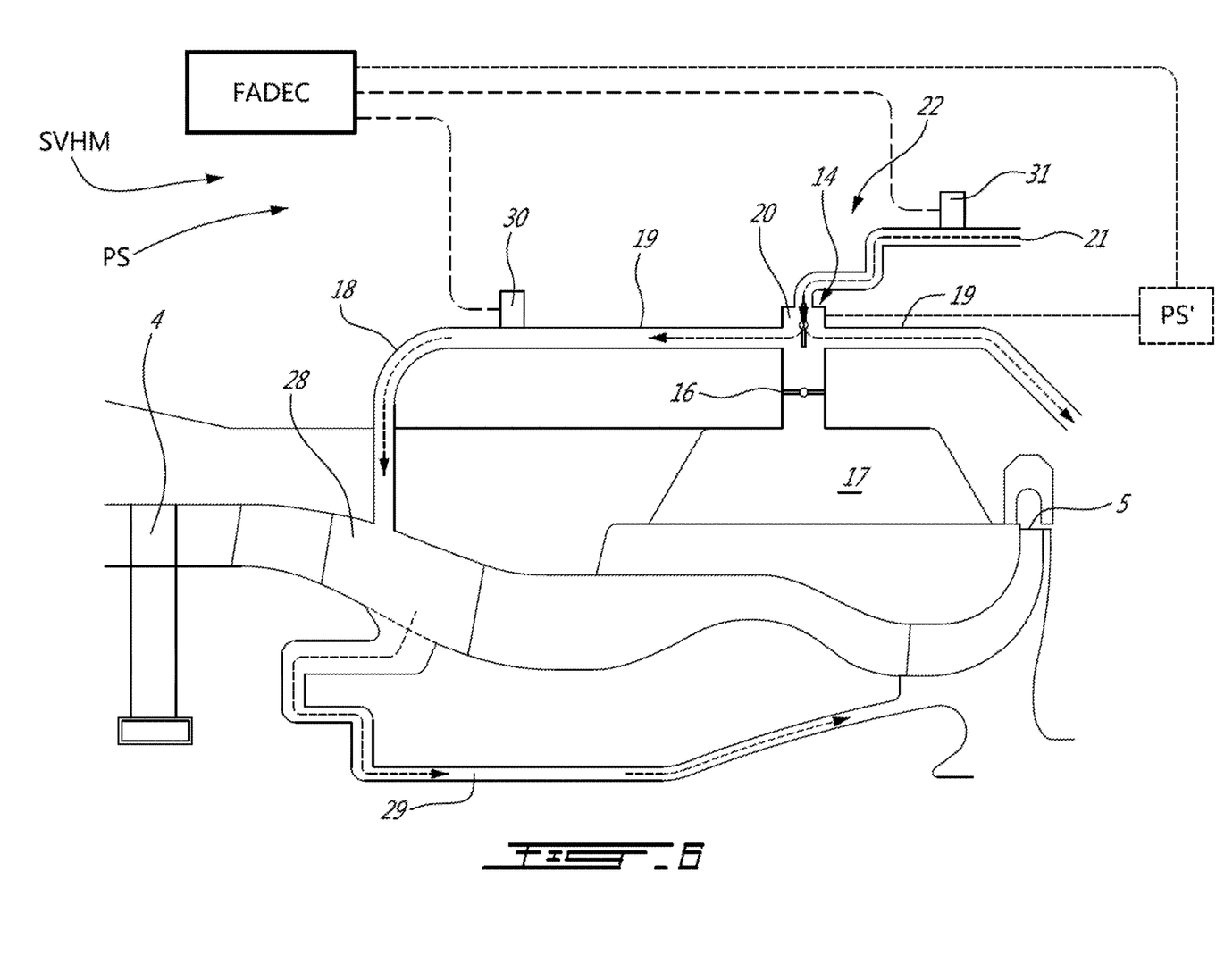
FIG. 6 is a detail axial cross section showing the air source input switching valve in a standby mode (low power regime) using high pressure compressor air for supplying the bleed air system of the engine.

Referring now to FIG. 4, a schematic flow chart showing the operation of the control system logic for the gas turbine engine 10 is shown. FIGS. 5-6 show physical examples of a compressor section 9 of the engine 10 with the air source input switching valve 14 in a motive powered mode (FIG. 5) and in the standby mode (see FIG. 6). The control system logic of FIG. 4 is provided to determine whether sufficient compressed air is being delivered to the engine bleed air system 18 in order to supply engine air demands, oil seals and air cooling during the standby mode. If sufficient air pressure or air pressure differential is not detected, the control system prevents the engine from entering into, or from exiting out of, one or both of the operating modes. For example, this may be in one particular embodiment; the control system (e.g. the FADEC in communication with sensors and/or actuators that may be required to perform this function) may abort the standby mode (e.g. idle cruise regime) and revert to the motive powered mode. In another embodiment, the control system may simply maintain the engine in the standby mode and prevent it from reverting to the motive powered mode. The operating position of the air source input switching valve 14 is determined by detecting air pressure changes and the control system inhibits or allows the standby mode accordingly. A signal is generated to warn the pilot that the air pressure system has malfunctioned and use of the standby mode has been denied to avoid engine damage.

Accordingly, a switching valve health monitor (SVHM) (FIGS. 5, 6) is provided, which may form part of the control system or may be separate therefrom within the gas turbine engine. The switching valve health monitor (SVHM) includes at least one of a pressure sensor 30/31 and a position sensor (PS) (or multiple of one or both) which is(are) operable to determine if the switching valve is functioning normally or abnormally. In some embodiments, the position sensor (PS) may be for example a combination of the FADEC operatively connected to the pressure sensor (s) 30/31 and configured to detect the operating position of the valve 14 based on detected air pressure changes that the FADEC may for example compare to pressure changes/pressure change ratio(s) expected to occur as a result of switches of the valve 14 between its positions. In other embodiments, a position sensor and/or actuator may be operatively connected to the valve 14 instead of or in combination with the sensor(s) 30/31. An example of such a position sensor may be a suitable conventional mechanical position sensor and/or servo or stepper motor (PS') operatively connected to the FADEC to detect the position of and/or actuate the valve 14 between its positions. Stated generally, the switching valve may be found to be functioning normally when it remains operable to switch, as required and when requested, between the first and second positions thereof such as to switch between the multiple air inputs (e.g. high and low pressure air inputs). The switching valve may be found to be functioning abnormally when switching between the inlet air sources is not possible—or the valve is otherwise not operating as expected (e.g. responding to inputs, stuck in one position, opening and closing irregularly, etc.).

With reference to FIG. 4, the control system is initiated when the pilot requests the standby mode as indicated with drawing reference numeral 12. The Control System initiates the air source inlet switching valve diagnostic test step 13 which commences with the air source inlet switching valve 14 in a motive powered mode position 15.

With reference to FIG. 5, the air source inlet switching valve 14 is shown in the motive powered mode position 15. The air source inlet switching valve 14 has a low pressure inlet 16, for example a solenoid valve, which is shown open and in communication with a low pressure air source 17, such as a low pressure plenum in communication with the low pressure compressor 4 (see FIG. 3). Compressed air is conveyed to the bleed air system 18 from the low pressure air source 17, when the switching valve 14 is in the motive powered mode of FIG. 5, where the low pressure inlet 16 connects to the two valve outlets 19 as indicated by dashed arrow lines.

As shown in FIG. 5, the air source inlet switching valve 14 also has a high pressure inlet 20, such as a solenoid valve (which is shown closed in FIG. 5) when the air source inlet switching valve 14 is shown in the motive powered mode position 15. The high pressure inlet 20 can be opened and then is in communication with a high pressure air source 21, such as a high pressure conduit in communication with the high pressure compressor 5 (see FIG. 3).

With reference to FIG. 6, the air source inlet switching valve 14 is shown in the standby mode position 22 (see FIG. 4). In the standby mode position 22 as seen in FIG. 6, compressed air is conveyed to the bleed air system 18 when the switching valve 14 has be actuated to close the low pressure inlet 16 and open the high pressure inlet 20. As a result, the high pressure inlet 20 connects to the valve outlets 19 and supplies air from the high pressure air source 21 to the bleed air system 18 originating from the high pressure compressor 5.

Returning to FIG. 4, starting from the motive powered mode 15, the control system switches the air source inlet switching valve (14, FIGS. 5-6) to the standby mode 22 i.e.: the low pressure inlet (16, FIGS. 5-6) is closed and the high pressure inlet (20, FIGS. 5-6) is opened. As a result, the high pressure inlet 20 connects to the valve outlets 19. As described in detail below, the engine includes at least one pressure sensor (30 or 31) that are interrogated to determine if the position of the switching valve 14 is correct i.e.: in the idle position as indicated by decision box 23 in FIG. 3. If pressure sensor 30 or 31 provides data indicating a "Yes" result, the control system allows the standby to continue (box 24). If pressure sensor 30 or 31 provides data indicating a "No" result, the control system inhibits the standby mode to continue and/or disallows standby mode (box 25).

As indicated by return arrow 26 in FIG. 4, once standby mode is allowed, on a periodic timed basis the control system interrogates the pressure sensors again and determines if the switching valve 14 remains in the correct position for the standby mode to continue (i.e.: return to box 23 to interrogate sensors).

As indicated by return arrow 27 in FIG. 4, once the standby mode is inhibited, the pilot is notified with a signal from the control system that the switching valve 14 is not in the correct position for the standby mode to continue (i.e.: return to box 12 to notify pilot) and the pilot can decide whether to request standby mode again or to continue with motive powered mode.

The means by which the control system interrogates pressure sensor 30 or 31 and determines the status of the switching valve 14, is described below with reference to FIGS. 5 and 6.

The air source input switching valve 14 has: a low pressure inlet 16 in communication with a low pressure air source 17; a high pressure inlet 20 in communication with a high pressure air source 21; and at least one valve outlet 19 in communication with the bleed air system 18 of the engine. In the example illustrated, the bleed air system 18 includes conduits conveying compressed air through a stationary strut 28 to an engine shaft 29 which can be directed to cool the turbines 11 (FIG. 3) and inflate oil seals of bearing housings. The details of the bleed air system 18 are known to those skilled in the art and need not be described in detail herein.

When the switching valve 14 is in the motive powered mode, as shown with dashed arrows in FIG. 5, compressed air is conveyed to the bleed air system 18 with the low pressure inlet 16 connecting to the valve outlet 19. In contrast, when the switching valve 14 is in the standby mode, as shown with dashed arrows in FIG. 6, compressed air is conveyed to the bleed air system 18 with the high pressure inlet 20 connecting to the valve outlet 19.

The aircraft pilot requests that the engine enter the idle mode by engaging the control system to actuate the switching valve 14 from the motive powered mode to the standby mode. The control system commences a system check by sensing a standby mode pressure using a bleed sensor 30 located downstream from the switching valve 14. The standby mode pressure is compared to a reference pressure, which could be an absolute static pressure value, an allowable range of pressure values or an expected pressure differential.

When the standby mode pressure measured by the bleed sensor 30 is equal to or greater than the reference pressure, the switching valve 14 is maintained in the standby mode (see box 24, FIG. 4). This result is because the air pressure delivered is equal or greater than the pressure required for engine demands. As indicated by return arrow 26 in FIG. 4, once standby mode is allowed, on a periodic timed basis the control system interrogates the bleed sensor 30 again to repeat the system check.

When the standby mode pressure is less than the reference pressure, the control system actuates the switching valve 14 from the standby mode to the motive powered mode, thereby inhibiting the operation of the engine in standby mode. This result is because the air pressure delivered is less than the pressure required for engine demands.

The bleed sensor 30 can also be interrogated to obtain a pressure reading in the bleed air system 18 when the switching valve 14 is in the motive powered mode, shown in FIG. 5. Before actuating the switching valve 14 from the motive powered mode to the standby mode, the reference pressure that is used can be an initiation pressure determined by the bleed sensor 30 downstream from the valve outlet 19. Therefore the pressure before standby mode and after standby mode can be compared to determine if there has been sufficient change in pressure. An inadequate pressure differential will indicate that the switching valve 14 or some other component of the air supply system has malfunctioned.

After actuating the switching valve 14 from the motive powered mode (as in FIG. 5) to the standby mode (as in FIG. 6) the standby mode pressure is compared to the initiation pressure to determine an initial pressure differential measurement. When the initial pressure differential is equal to or greater than a predetermined downstream reference value, the switching valve is maintained in the standby mode (i.e. sufficient air pressure detected). When the initial pressure differential is less than the predetermined downstream reference value, the switching valve is actuated from the standby mode to the motive powered mode to inhibit the standby mode or standby mode (i.e. not sufficient air pressure detected). The above described method uses only one sensor, the bleed sensor 30. The absolute air pressure measured after entering standby mode can be compared to an expected reference value. Alternatively, the bleed sensor 30 can measure air pressure before and after entering standby mode, and the pressure differential can be compared to an expected reference value.

By comparing the initial pressure differential to the downstream reference value, a switching valve status can be determined namely: the switching valve 14 is fully open (change in pressure is adequate); the switching valve 14 is fully closed (virtually no change in pressure detected); or the switching valve 14 is partially open (inadequate pressure change detected).

An optional method includes additional pressure sensors to determine the air pressure upstream from the switching valve 14. Before actuating the switching valve 14 from the motive powered mode (FIG. 5) to the standby mode (FIG. 6), sensing the reference pressure can include using a source sensor 31 located upstream from the high pressure inlet 20 of the switching valve 14. The source sensor 31 in the standby mode (FIG. 6) can determine the source pressure of the high pressure air source 21 before actuating the switching valve 14 from the motive powered mode (FIG. 5) to standby mode (FIG. 6).

After actuating the switching valve 14 from the motive powered mode to the standby mode, the standby mode pressure (from bleed sensor 30) is compared to the source pressure (from source sensor 31) to determine a secondary pressure differential. When the secondary pressure differential is less than an upstream reference value, the switching valve 14 is maintained in the standby mode (i.e. sufficient air pressure detected). When the secondary pressure differential is equal to or greater than the upstream reference value, the switching valve 14 is actuated from the standby mode to the motive powered mode (i.e. not sufficient air pressure detected).

The secondary pressure differential when compared to the upstream reference value can also be used to determine a switching valve status namely: the switching valve is fully open (bleed sensor 30 and source sensor 31 measure equal pressures approximately); the switching valve is fully closed (bleed sensor 30 measures a pressure significantly lower than source sensor 31); and the switching valve is partially open (bleed sensor 30 measures a pressure less than source sensor 31 and insufficient pressure differential is detected).

The above description is meant to be exemplary only, and one skilled in the relevant arts will recognize that changes may be made to the embodiments described without departing from the scope of the invention disclosed. The present disclosure may be embodied in other specific forms without departing from the subject matter of the claims. The present disclosure is intended to cover and embrace all suitable changes in technology. Modifications which fall within the scope of the present invention will be apparent to those skilled in the art, in light of a review of this disclosure, and such modifications are intended to fall within the appended claims. Also, the scope of the claims should not be limited by the preferred embodiments set forth in the examples, but should be given the broadest interpretation consistent with the description as a whole.

What is claimed is:

1. A method of operating an aircraft having a plurality of gas turbine engines with a bleed air system, the method comprising:
    operating the engines in a motive powered mode to provide motive power to the aircraft;
    operating a switching valve of at least one of the engines to select a source of pressurized air from multiple air sources;
    providing said pressurized air to a cavity of said at least one gas turbine engine having seals for pressurizing the seals of the cavity during engine use;
    testing the switching valve in flight to determine if the switching valve is functioning abnormally; and
    where the switching valve is determined to be functioning abnormally, controlling the at least one gas turbine engine to prevent in flight a change of the operating mode of said at least one gas turbine engine from said motive powered mode to a standby mode, wherein in said standby mode the at least one gas turbine engine provides less power to the aircraft than in the powered mode.

2. The method of claim 1, wherein the gas turbine engine is on a multi-engine aircraft having at least a first and a second engine, at least one of the first and second engines is said gas turbine engine, the method further comprising, in flight, operating the first engine in the motive powered mode to provide motive power to the aircraft and operating the second engine in either the powered mode or the standby mode to provide substantially no motive power to the aircraft, and when operating the second engine in the motive powered mode, using the switching valve to provide the pressurized air from a first air source of the multiple air sources and when operating the second engine in the standby mode using the switching valve to provide the pressurized air from a second air source of the multiple air sources, the second air source having a higher pressure than the first air source.

3. The method of claim 1, further comprising sensing a status of the switching valve, the status indicative of one or more of the multiple air sources in communication with the cavity.

4. The method of claim 3, wherein sensing the status of the switching valve includes determining at least one of a position of the switching valve and a pressure of the pressurized air.

5. The method of claim 1, further comprising using a position sensor to sense a status of the switching valve.

6. The method of claim 5, further comprising using the position sensor to determine a position of the switching valve, the position including fully open, fully closed, and/or a partially open position.

7. The method of claim 6, further comprising, when determining the partially open position of the switching valve, measuring a percentage opening of the switching valve in the partially open position.

8. The method of claim 1, further comprising using a pressure sensor to sense the status of the switching valve, the pressure sensor being located upstream and/or downstream of the switching valve.

9. The method of claim 1, wherein controlling the gas turbine engine to prevent the change of the operating mode thereof further includes, if the gas turbine engine is operating in the standby mode, preventing the gas turbine engine from operating in the motive powered mode.

10. The method of claim 1, wherein the multiple air sources includes a first source of low pressure air and a second source of high pressure air, the step of operating the switching valve including using the switching valve to direct the low pressure air from the first source to the cavity when the gas turbine engine is operating in the motive powered mode, and using the switching valve to direct the high pressure air from the second source to the cavity when the gas turbine engine is operating in the standby mode.

11. The method of claim 10, further comprising, in flight, switching the gas turbine engine between the motive powered mode and the standby mode, and using a control system to operate the switching valve accordingly.

12. The method of claim 1, further comprising using a control system of the gas turbine engine to perform the step of prevent the change of the operating mode, including generating an alert that the switching valve is functioning abnormally.

13. A gas turbine engine, comprising:
a bleed air system including a switching valve having at least first and second air inlets and an outlet in communication with a cavity of the gas turbine engine having one or more seals therein, the first inlet of the air switching valve in communication with a low pressure air source, the second inlet of the air switching valve in communication with a high pressure air source;
a switching valve health monitor, the switching valve health monitor operable to determine if the switching valve is functioning normally or abnormally, the switching valve functioning normally when operable to switch between the first and second inlets, and the switching valve functioning abnormally when switching between the first and second inlets is not possible or the switching valve is otherwise not operating as expected; and a FADEC configured to prevent a change from a motive powered mode to a standby power of the gas turbine engine when the abnormal functioning of the switching valve is determined.

14. The gas turbine of claim 13, wherein the gas turbine engine is operable in either the motive powered mode or the standby mode, the switching valve being in a first position when the gas turbine engine is running in the motive powered mode and the switching valve being in a second position when the gas turbine engine is running in the standby mode.

15. The gas turbine engine of claim 14, wherein when the switching valve is in the first position and the gas turbine engine is running in the motive powered mode, the switching valve providing communication between the low pressure air source and the cavity, and when the switching valve is in the second position and the gas turbine engine is running in the standby mode, the switching valve providing communication between the high pressure air source and the cavity.

16. The gas turbine engine of claim 13, wherein the switching valve health monitor includes a pressure sensor and/or a position sensor, the pressure sensor located upstream or downstream of the switching valve and operable to measure a pressure of air form a respective one of the first and second inlets or at the outlet, the position sensor operable to detect a position of a valve element of the switching valve.

17. A multi-engine aircraft comprising:
a first gas turbine engine for providing a first engine power output; and a second engine for providing a second engine power output, the second engine having a bleed air system and an air switching system including: an switching valve having:
a low pressure inlet in communication with a first bleed location in a compressor of the second engine; a high pressure inlet in communication with a second bleed location in the compressor of the second engine, the second bleed location being downstream of the first bleed location relative to main gas flow through the compressor of the second engine; and a switch outlet in communication with at least one cavity of the second engine having seals therein; wherein the switching valve is displaceable between at least first and second positions, the first position interconnecting the lower pressure inlet and the switch outlet, and the second position interconnecting the high pressure inlet and the switch outlet;
a switching valve health monitor, the switching valve health monitor including at least one of a pressure sensor and a position sensor operable to determine if the switching valve is functioning normally or abnormally, the switching valve functioning normally when operable to switch between the first and second positions and functioning abnormally when switching between the first and second positions is not possible, and
a FADEC configured to prevent a change from a motive powered mode to a standby power of the gas turbine engine when the abnormal functioning of the switching valve is determined.

* * * * *